(12) United States Patent
Wiseman et al.

(10) Patent No.: US 11,669,839 B2
(45) Date of Patent: Jun. 6, 2023

(54) SYSTEM AND METHOD FOR PROCESSING A DIGITAL TRANSACTION

(71) Applicant: Accenture Global Solutions Limited, Dublin (IE)

(72) Inventors: David Wiseman, Gloucestershire (GB); Peter McElwaine-Johnn, Oxon (GB); Stirling Bookallil, York (GB); Jane Adshead, Surrey (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/873,643

(22) Filed: Jan. 17, 2018

(65) Prior Publication Data

US 2019/0012674 A1  Jan. 10, 2019

Related U.S. Application Data

(60) Provisional application No. 62/528,786, filed on Jul. 5, 2017.

(51) Int. Cl.
*G06Q 20/40* (2012.01)
*G06Q 20/02* (2012.01)
*G06F 21/31* (2013.01)

(52) U.S. Cl.
CPC ....... *G06Q 20/40145* (2013.01); *G06F 21/31* (2013.01); *G06Q 20/02* (2013.01); *G06Q 20/4016* (2013.01)

(58) Field of Classification Search
CPC ............. G06Q 20/40145; G06Q 20/02; G06Q 20/4016; G07D 7/00; G06F 21/31
(Continued)

(56) References Cited

U.S. PATENT DOCUMENTS 7,690,032 B1 * 3/2010 Pierce .............................. 726/9
2007/0124189 A1 * 5/2007 Stoughton et al. ............... 705/8
(Continued)

FOREIGN PATENT DOCUMENTS

CN         106447434 A     2/2017
WO    WO 2016/193156 A1  12/2016

OTHER PUBLICATIONS

Extended European Search Report for European Application No. 18179876.0, dated Sep. 19, 2018, pp. 1-7.
(Continued)

*Primary Examiner* — Bennett M Sigmond
*Assistant Examiner* — George N. Proios
(74) *Attorney, Agent, or Firm* — Crowell & Moring LLP

(57) ABSTRACT

A system for processing a digital transaction includes a user authenticator, a processor in communication with the user authenticator, and non-transitory computer readable media that stores instruction code. The user authenticator is configured to receive biometric data associated with a user from a sensor. The sensor corresponds to at least one of: an image sensor, a finger print sensor, a motion sensor, a user interaction pattern sensor, and an infrared image sensor. The user authenticator is further configured to receive user identifying information and to determine whether the biometric data associated with the user is associated with the user identifying information to thereby validate the user. If the user is validated, the user authenticator is configured to generate user credentials associated with the user. The instruction code is executed by the processor and causes the processor to receive, from a user terminal, the user credentials. If the user credentials are valid, the processor determines different categories of information required to process the digital transaction; determines one or more data source systems that store information related to the different categories of infor-
(Continued)

mation and the user identifying information; aggregates, from one or more data source systems, the information associated with the user identifying information; and communicates the aggregated information to a processing system to thereby process the digital transaction.

15 Claims, 6 Drawing Sheets

(58) Field of Classification Search
USPC .......................................................... 705/44
See application file for complete search history.

(56) References Cited

U.S. PATENT DOCUMENTS

| | | | |
|---|---|---|---|
| 2007/0185797 A1* | 8/2007 | Robinson | 705/36 |
| 2008/0091613 A1* | 4/2008 | Gates et al. | 705/59 |
| 2012/0185375 A1 | 7/2012 | Tealdi et al. | |
| 2015/0007297 A1 | 1/2015 | Grossemy | |
| 2015/0227937 A1 | 8/2015 | Giles | |
| 2018/0338018 A1* | 11/2018 | S. et al. | H04L 69/08 |

OTHER PUBLICATIONS

Office Action in Europe Application No. 18179876.0, dated Jul. 22, 2020, 6 pages.
Application Text Intended for Grant in related European Patent Application No. 18179876.0, filed Dec. 21, 2021, 31 pgs.
EPO Communication under Rule 71 (3) EPC, Intention to grant a European Patent, for related European Patent Application No. 18179876.0, dated Dec. 21, 2021, 5 pgs.
EPO Intention to grant a European Patent, Electronically authenticated, for related European Patent Application No. 18179876, dated Dec. 21, 2021, 1 pg.
Search Report issued in Singapore Application No. 10201804886U dated Jun. 25, 2021 (two (2) pages).
Written Opinion issued in Singapore Application No. 10201804886U dated Jun. 25, 2021 (six (6) pages).

* cited by examiner

SYSTEM AND METHOD FOR PROCESSING A DIGITAL TRANSACTION

RELATED APPLICATIONS

This application claims the benefit of priority to U.S. Provisional Application No. 62/528,786, filed Jul. 5, 2017, the content of which is hereby incorporated by reference in its entirety.

BACKGROUND

Field

This application generally relates to data processing. In particular, this application describes a system and method for processing a digital transaction.

Description of Related Art

Obtaining information for completing a transaction can be an arduous and time-consuming process. For example, in the context of obtaining a mortgage loan, a borrower may have to provide pages and pages worth of information to a lender, such as bank statements, investment statements, past addresses, salary information, past job information, etc.

In some cases, information initially provided by the borrower may trigger a requirement for additional information, adding additional delay to the process. This inefficiency may result in missed opportunities. For example, the borrower may become frustrated with the process and abandon the process altogether, or turn to another lender that is believed to offer a faster process.

Existing systems and techniques for processing transaction information make use of numerous isolated devices making use of proprietary formats for organizing and processing data. The isolated devices are often arranged such that one device does not trust information from another device. Thus, each device performs its own validation of received information. In addition, isolated devices typically are not configured to make efficient use of network connectivity, standardized protocols, or shared resources, such as data storage. The use of isolated devices further adds delays to transaction processing, requires that information be duplicated across devices, produces duplication of effort with respect to certain aspects of transaction processing, and significantly increases overall system complexity required to process a transaction from end to end.

BRIEF SUMMARY

In one aspect, a system for processing a digital transaction includes a user authenticator, a processor in communication with the user authenticator, and non-transitory computer readable media that stores instruction code. The user authenticator is configured to receive biometric data associated with a user from a sensor. The sensor corresponds to at least one of: an image sensor, a finger print sensor, a motion sensor, a user interaction pattern sensor, and an infrared image sensor. The user authenticator is further configured to receive user identifying information and determine whether the biometric data associated with the user is associated with the user identifying information to thereby validate the user. If the user is validated, the user authenticator is configured to generate user credentials associated with the user. The instruction code is executed by the processor and causes the processor to receive, from a user terminal, the user credentials. If the user credentials are valid, the processor determines different categories of information required to process the digital transaction. Next the processor determines one or more data source systems that store information related to the different categories of information and with the user identifying information. The processor then aggregates, from one or more data source systems, the information associated with the user identifying information and communicates the aggregated information to a processing system to thereby process the digital transaction.

In a second aspect, a method for processing a digital transaction includes receiving, from a user terminal that includes a sensor, biometric data associated with a user. The sensor corresponds to at least one of: an image sensor, a finger print sensor, a motion sensor, a user interaction pattern sensor, and an infrared image sensor. The method also includes receiving user identifying information, and determining whether the biometric data associated with the user is associated with the user identifying information to thereby validate the user. If the user is validated, the method includes generating user credentials associated with the user. The method also includes receiving the user credentials. If the user credentials are valid, the method includes determining different categories of information required to process the digital transaction, and determining one or more data source systems that store information related to the different categories of information and user identifying information. The method further includes aggregating, from the one or more data source systems, the information associated with the user identifying information, and communicating the aggregated information to a processing system to thereby process the digital transaction.

In a third aspect, a non-transitory computer readable media that stores instruction code for processing a transaction. When the instruction code is executed by a machine, the machine performs acts that include receiving, from a user terminal that includes a sensor, biometric data associated with a user, receiving user identifying information, and determining whether the biometric data associated with the user is associated with the user identifying information to thereby validate the user. If the user is validated, user credentials associated with the user are generated. The instruction code also causes the machine to perform acts including receiving the user credentials. If the user credentials are valid, the machine determines different categories of information required to process the digital transaction and determines one or more data source systems that store information related to the different categories of information and the user identifying information. The machine further aggregates, from the one or more data source systems, the information associated with the user identifying information and communicates the aggregated information to a processing system to thereby process the digital transaction.

DETAILED DESCRIPTION

The embodiments described below overcome the problems described in the background by providing a system that speeds up transaction processing and approval, reduces errors and other problems caused by information errors and/or incompatibilities among devices/systems involved in the transaction processing. The system also provides a centralized trust mechanism to ensure that information communicated by the system is trustworthy. As a result, the system uses less power and computational resources than disparate systems because redundancies present in those disparate systems are eliminated.

In operation, a user, via a terminal, provides a minimal amount of identifying information along with consent to obtain additional information, related to the user, from other sources. The system then attempts to obtain the additional information required to complete the transaction from the other sources, such as third-party data source systems. The required information is specified to the system beforehand by an agent system or by a system operator based on instructions received on behalf of a representative of the agent system. After obtaining the information, the system may communicate the information to the user so that the user can confirm or correct erroneous information. Once confirmed, the system communicates the information to the agent system to facilitate completion of the transaction by the agent system.

Embodiments of the invention can process transactions in a fraction of the time required to process similar transactions using conventional systems. For example, an exemplary embodiment can process a transaction (e.g., a loan transaction) in hours or even minutes, instead of in weeks or days, by exploiting real-time consented access to trusted data sources, which is much faster and more accurate than relying on forms filled out by customers. In addition, the embodiment has direct access to transactional and behavioral financial information from banks, government agencies, etc. This obviates the need for the customer user to reconstruct personal information, such as their earning and spending patterns, as well as obviating the need for the lender to have to process paper-based financial documents, such as pay slips and bank statements.

Figure 1:
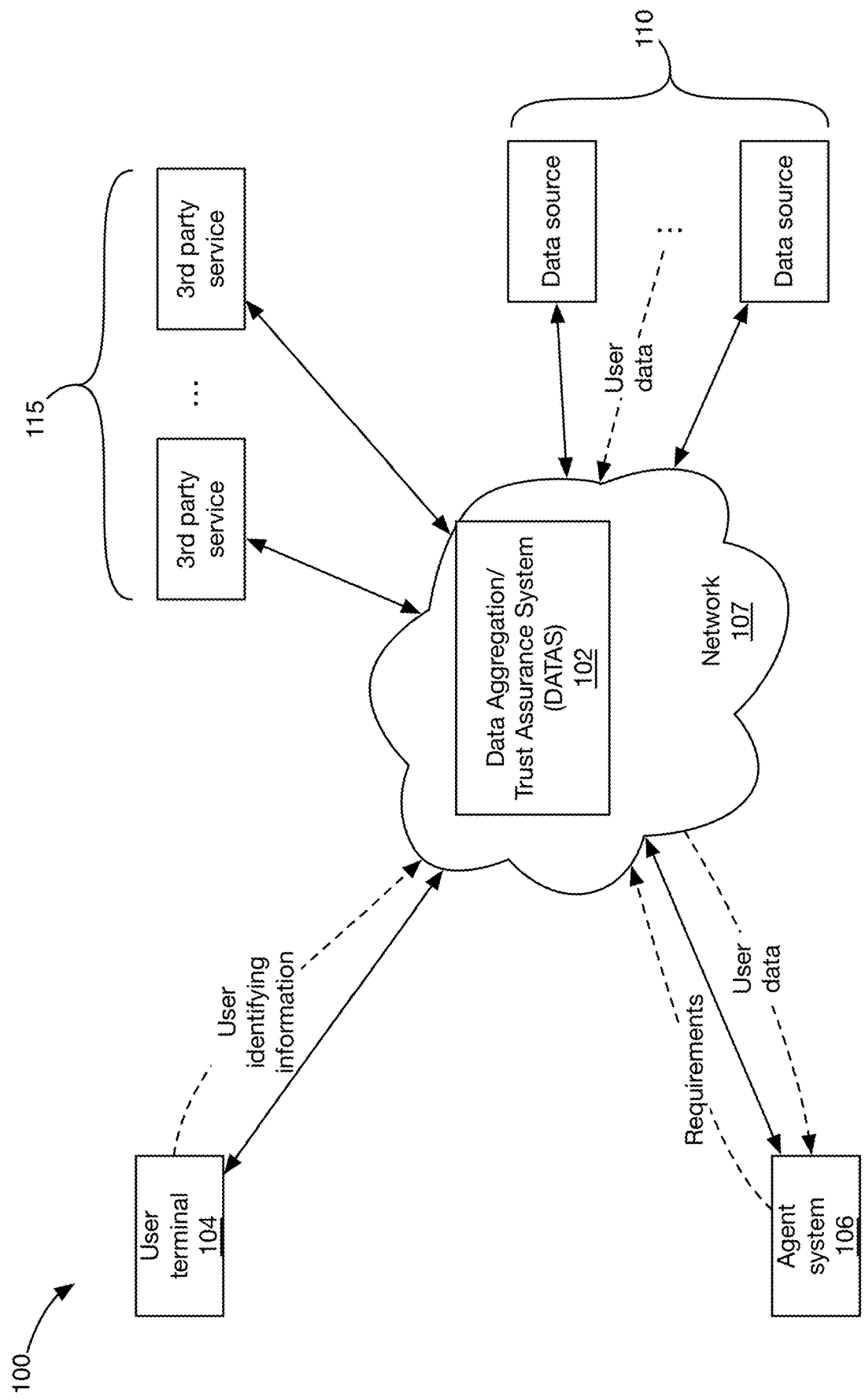
FIG. 1 illustrates an exemplary environment that includes various entities that facilitate processing a digital transaction.

FIG. 1 illustrates an exemplary environment 100 that includes various devices that facilitate processing a digital transaction. The devices may be owned and/or operated by entities, such as corporations, government agencies, institutions, individuals, etc. For ease of discussion, devices and entities are used interchangeably unless otherwise indicated.

Exemplary entities of the environment 100 include a data aggregation and trust assurance system (DATAS) 102, a user terminal 104, an agent system 106, one or more data sources systems 110, and optionally one or more $3^{rd}$ party service systems 115. The DATAS 102, user terminal 104, agent system 106, data source systems 110, and $3^{rd}$ party service systems 115 may communicate with one another via a network 107, such as the Internet. While a single agent system 106 and user terminal 104 are illustrated, it is understood that numerous agent systems 106 and/or user terminals 105 may communicate with the DATAS 102 via the network 107.

The user terminal 104, agent system 106, data source systems 110, and $3^{rd}$ party service systems 115 may correspond to computer systems such as an Intel®, AMD®, or PowerPC® based computer system or a different computer system and can include application specific computer systems. The computer systems may include an operating system, such as Microsoft Windows®, Linux, Unix® or other operating system.

The user terminal 104 may be operated by a user/individual interested in starting a transaction with an agent associated with the agent system 106. For example, the user may be a borrower and the agent may be a lender. The user terminal 104 may be a mobile device, PC, etc., that may include various I/O interfaces such as USB interfaces, cameras, etc., that facilitate capturing various images, which will be described in more detail below. The user terminal 104 may implement a browser to facilitate communicating information to and from the user terminal 104. The user terminal 104 may execute code on the user terminal along with code communicated to the terminal 104 from the DATAS 102.

As noted above, the agent system 106 may be operated by an agent such as a lender. The agent system 106 may be configured to facilitate communicating information with the DATAS 102. For example, the agent system 106 may implement an interface that facilitates communicating agent requirements to the DATAS 102 and receiving user data from the DATAS 102. In this regard, the agent system 106 may implement an API that facilitates communicating the information such as a SOAP-based web service, a RESTful API, or different type of API.

Each data source system 110 may store information related to one or more individuals. For example, a first data source system 110 may be owned/operated by a bank and may be configured to provide bank statements associated with various individuals having accounts at the bank. A second data source system 110 may be owned/operated by a credit agency and may be configured to provide credit scores, loan details, etc., associated with various individuals. A third data source system 110 may be owned/operated by a government municipality and may be configured to provide personal information such as social security numbers, addresses, etc., associated with various individuals.

Each data source system 110 may implement an API such as a SOAP-based web service, a RESTful API, and/or a different API to facilitate communicating information to and from other systems of the environment 100.

The $3^{rd}$ party service systems 115 may be systems configured to provide services to the DATAS 102 to facilitate processing operations performed by the DATAS 102. For example, a first $3^{rd}$ party service system 115 may be configured to perform various image processing operations that may be utilized by the DATAS 102 to identify or authenticate a user of the user terminal 104. A second $3^{rd}$ party service system 115 may be configured to perform operations for identifying textual and other information in a document. The $3^{rd}$ party service systems 115 may implement an API such as a SOAP-based web service, a RESTful API, and/or a different API to facilitate communicating information to and from other systems of the environment 100.

Figure 2:
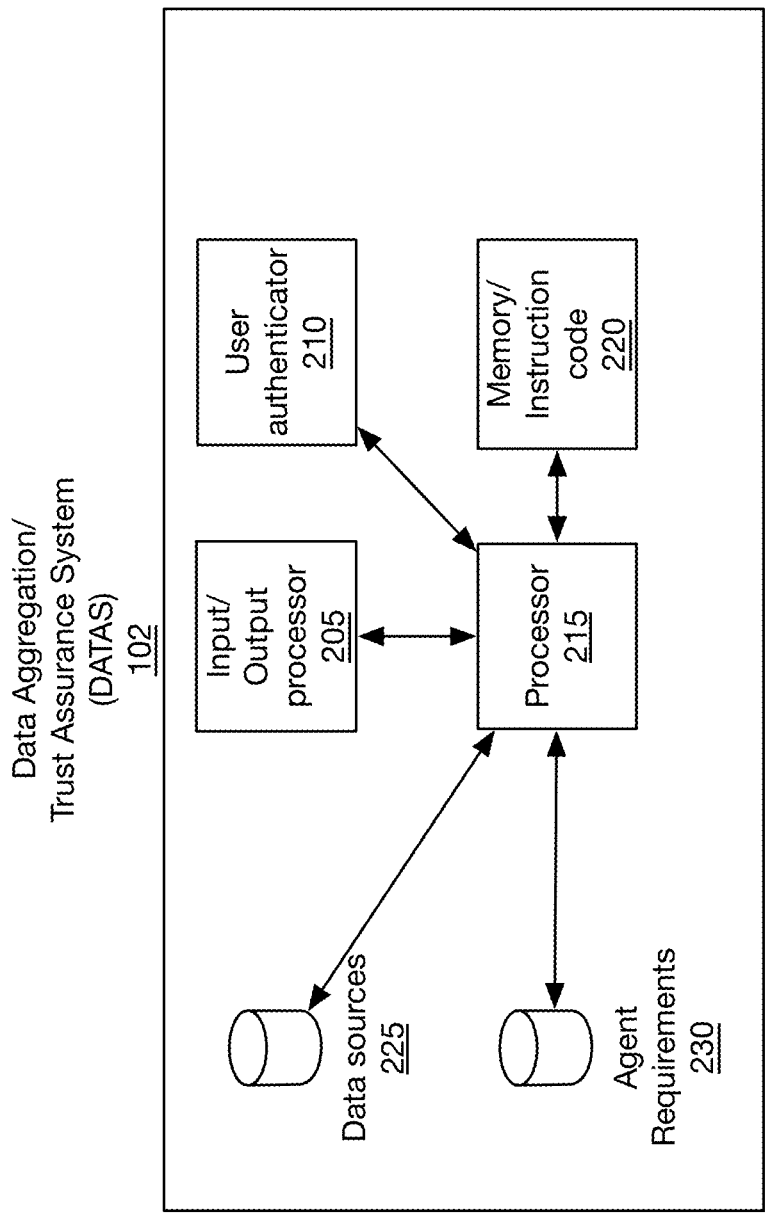
FIG. 2 illustrates an exemplary transaction data aggregation and trust assurance system of the environment.

FIG. 2 illustrates an exemplary DATAS 102. As described below, the DATAS 102 aggregates information from a plurality of disparate data source systems and provides a trust mechanism that facilitates determining a level of trustworthiness associate with the information. As shown, the DATAS 102 includes various subsystems that facilitate processing a digital transaction such as an input/output processor 110, and a user authenticator 210. The DATAS 102 includes a processor 215 that executes instruction code stored in a memory device 220 for coordinating activities performed between the various subsystems. The DATAS 102 may include other subsystems.

The I/O processor 205 of the DATAS 102 is configured to facilitate communications with entities outside of the DATAS 102. In this regard, the I/O processor 205 may be configured to dynamically determine the communication methodology utilized by entities of the environment 100 for communicating information to the entities using the determined communication methodology. For example, the I/O processor 205 may determine that a first entity utilizes a RESTful API and may therefore communicate with the entity using a RESTful communication methodology.

As described in more detail below, the I/O processor 205 may implement a web browser to facilitate generating web-based interfaces through which users may interact with the DATAS 102. The web browser may implement a web services interface to facilitate automating some of the web-based functionality via a computer. For example, one or more of the entities of the environment may utilize the web services interfaces to control aspects and/or interact with the DATAS 102.

In addition or alternatively, an application (i.e., app) specifically configured to communicate information to and from to the DATAS 102 may reside on the user terminal 104. The app may provide services similar to those provided via the web browser of the DATAS 102.

The user authenticator 210 is configured to determine whether user credentials (e.g., login ID and password) provided via the user terminal 104 by the user are valid.

The user credentials may have been previously provided to the user after confirming an identity of the user. The credentials may also be associated with user identifying information 502 (FIG. 5) that facilitates locating information related to the user in databases of various data sources In one implementation, the user's identity may be confirmed based on one or more identification documents such as a photo ID, government ID, etc. For example, various image processing techniques may be performed to identify an image of an individual on the identification document (FIG. 5, 505) and to compare the image with an image of the user to determine whether the individual pictured on the identification document is the user.

In some implementations, the user authenticator 210 may be configured to perform the various operations above and/or configured to operate in conjunction with one or more 3$^{rd}$ party services 115 such as CatfishAIR® by AuthenticID® in making these determinations. In other implementations, confirmation of the identity of the user may be performed entirely by 3$^{rd}$ party services.

Other types of user credentials are contemplated. For example, the user authenticator may be configured to receive biometric information, such as biometric information associated with one or more finger prints, facial infrared scans, etc., to authenticate the user of the user terminal. In this regard, the user terminal may be configured with, for example, a sensor such as a finger print sensor, infrared imager sensor, etc. Biometric information associated with the user may have been previously obtained. For example, biometric information may have been obtained by and stored on a 3$^{rd}$ party service system 115, a data source system 110 or a different system in communication with the DATAS 102. In addition or alternatively, the information may have been obtained by and stored by the DATAS 102.

The processor 215 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

It is contemplated that the I/O processor 205, user authenticator 210, and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 3:
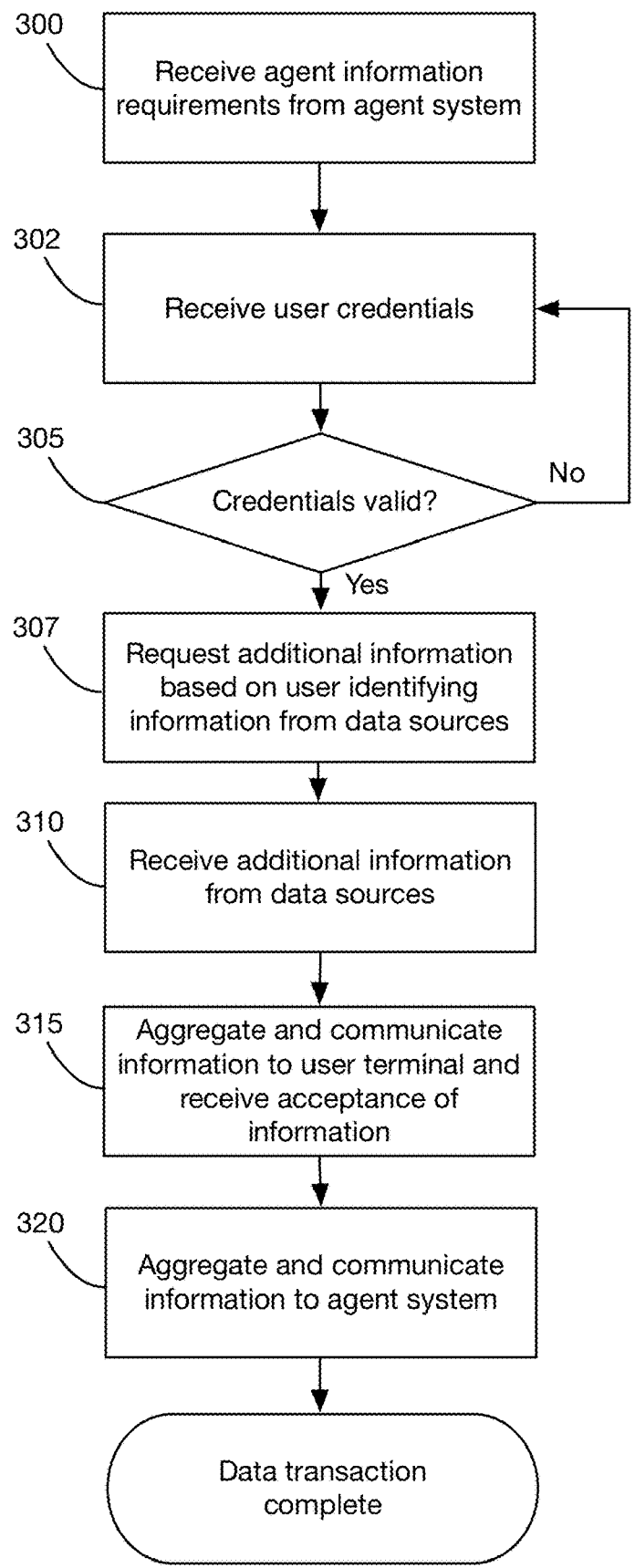
FIGS. 3 and 4 illustrate operations performed by various entities of the environment in processing a digital transaction.

Operations performed by one or more of the subsystems of the DATAS 102 are illustrated in FIG. 3. In this regard, the operations may be implemented via instruction code stored in non-transitory computer readable media 220 that resides within the subsystems configured to cause the respective subsystems to perform the operations illustrated in the figures and discussed herein.

At block 300, the DATAS 102 may receive data that defines agent information requirements. The DATAS 102 may receive agent information requirements from the agent system 106 or from another device depending on a configuration of environment 100. For example, the agent system 106 may be a loan origination system at a financial institution. The information requirements may specify categories of information required in processing a transaction such as a mortgage loan. For example, applicant or user identifying information such as the full name, address, social security number, etc., associated with a user requesting a loan may be required. Information that facilitates determining the user's financial health such as the user's salary, existing debt, credit score, etc., may be required.

The I/O processor 205 of the DATAS 102 may implement an API, such as a SOAP-based web service, a RESTful API, or a different API to facilitate communicating information to and from the agent system 106. The DATAS 102 may store the received information requirements to an agent requirement database 230. In this regard, the agent requirement database 130 may store information requirements associated with any number of agents. Table 1 illustrates exemplary information that may be required by the agent system 106 to process a transaction that may be stored in the agent requirement database 230.

TABLE 1

| Category |
| --- |
| First name |
| Last name |
| Address(s) |
| Bank account(s) values |
| Credit Score(s) |
| Address 1 |
| . . . |

At block 302, the DATAS 102 may receive user credentials. For example, the DATAS 102 may receive user credentials from user terminal 104 such as a user login ID and a user password. The I/O processor 205 of the DATAS 102 may generate one or more user interfaces that facilitate receiving the user credentials from the user on, for example, the user terminal 104. For example, the I/O processor 205 may implement a web server that communicates web pages to the user terminal 104.

The credentials may have been previously provided to the user after verifying the user's identity. The credentials may also have been associated with user identifying information 502 (FIG. 5) that facilitates locating information related to the user in databases of various data sources.

Figure 5:
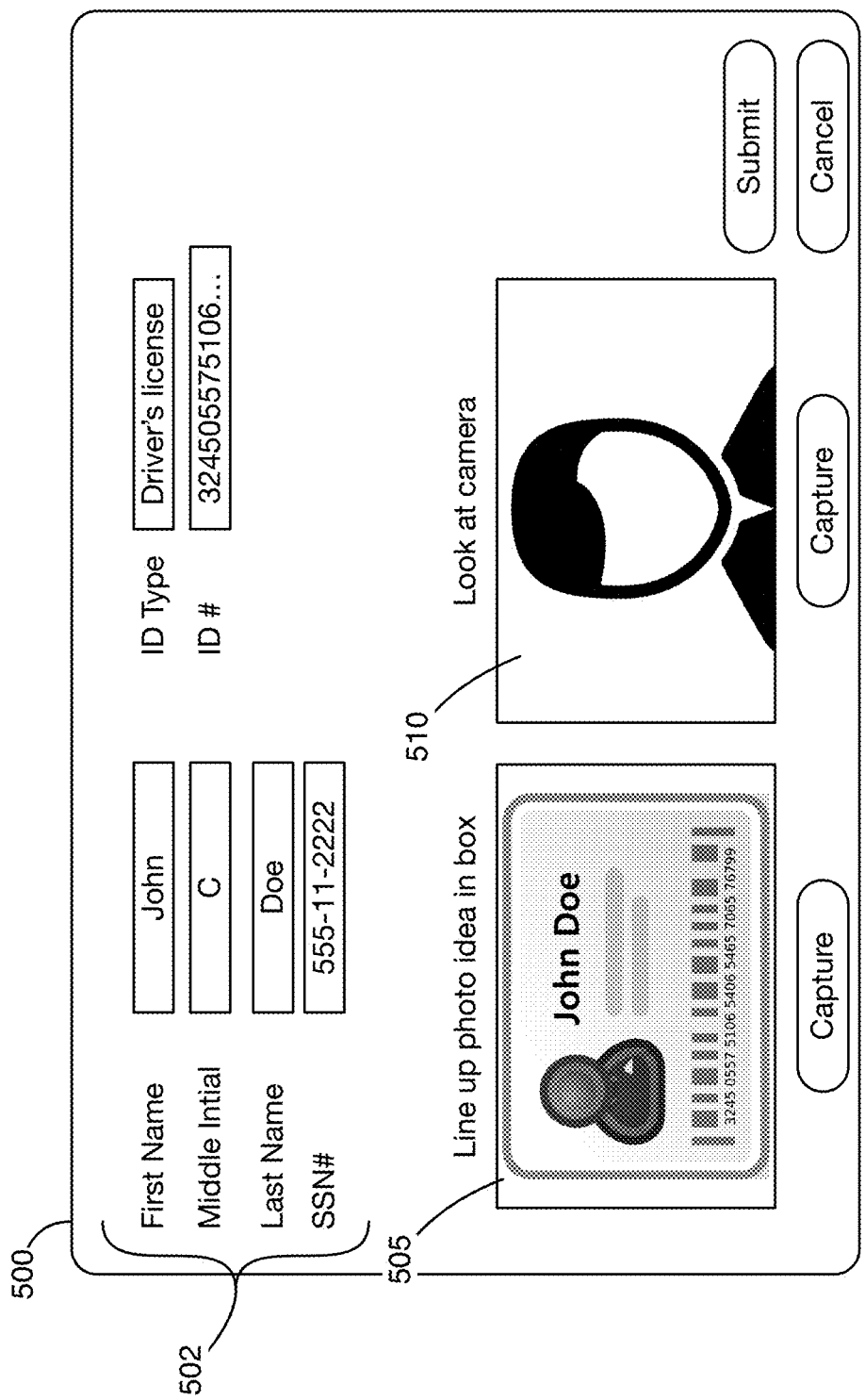
FIG. 5 illustrates a first exemplary interface that may be generated by an input/output processor of the environment.

FIG. 5 illustrates an exemplary interface 500 that may be generated by the I/O processor 205 to facilitate collecting user identifying information 502 and verifying that the user identifying information is associated with the user providing the information. The exemplary interface 500 may include fields for specifying user identifying information 502 such as the user's full name and social security number. Other implementations of interface 500 can include additional or other fields, such as the user's home address, phone number, age, email address, etc., and/or other user identifying information.

The interface 500 may be configured to facilitate scanning an authenticated ID 505 such as a government issued ID. In this regard, the interface 500 may prompt the user hold up the identification document 505 to a camera of the user terminal 104. The interface 500 may be configured to capture an image of the identification document 505 automatically or upon selection of a capture button. The interface 500 may further be configured to facilitate obtaining an image 510 of the user via the camera of the user terminal 104.

Image data associated with the scanned identification document 505 and the user may be communicated to the user authenticator 210 of the DATAS 102, and the user authenticator 210 may process the images to identify the user. As noted above, the user authenticator 210 may use various image processing techniques to identify an image of an individual on the identification document 505 and to compare the image with the user image 510 to determine whether the user corresponds to the individual associated with the identification document 505 to thereby identify the user. In certain implementations, the authenticator 210 may be configured to validate the authenticated ID 305 using internal or external databases, image processing techniques, biometric data, etc. In this regard, as noted above, the user authenticator 210 may operate in conjunction with one or more 3$^{rd}$ party services 115 that provide image processing services in making this determination.

In yet other implementations, the authenticator 210 may use biometric data from an image sensor, a finger print sensor, a motion sensor, a user interaction pattern sensor, and/or an infrared image sensor to confirm that the user identifying information is associated with the user entering the information.

After verifying the user's identity, the user may be provided an opportunity to specify secure user credentials (e.g., user name and password) to facilitate access to the DATAS 102.

Returning to FIG. 3, if at block 305, the user credentials are valid, then at block 307, the DATAS 102 may request additional information associated with some or all of the user identifying information 502 from one or more data source systems 110. The additional information may correspond to information associated with the agent information requirements referred to above.

In some implementations, the DATAS 102 may request consent from the user to search the data sources for information related to the user. For example, the DATAS 102 may present a list of information to be retrieved and data sources that may include the information. The user may consent to retrieving all the information or a subset of information. The user may further consent to accessing all the data sources or a subset of the data sources to retrieve the information. In some instances, consent to information and/or a data source may require user credentials associated with a specific data source. For example, access to a bank account at a bank may require the user's bank credentials (i.e., the login ID and password used to access the bank account). In this regard, the DATAS 102 may prompt the user to provide the bank credentials.

Table 2 illustrates an exemplary set of records stored in a data source 225 (e.g., a database) of the DATAS 102 that the DATAS 102 may utilize in selecting a data source for information retrieval.

TABLE 2

| Data source | Communication Detail | Information Stored | Trustworthiness |
|---|---|---|---|
| Bank A | www.banka.com, restful interface, other parameters | Bank statements | 1 |
| Rating Agency A | www.raintingagencya.com, soap interface, other parameters | Credit ratings, loan accounts | 3 |
| Rating Agency B | www.raintingagencyb.com, soap interface, other parameters | Credit ratings, loan accounts | 2 |
| Gov't Agency A | www.govtagencya.gov, restful interface, other parameters | SSN, address | 1 |
| Property Information Provider A | www.propertyinfoprovider.com, restful interface, other parameters | Property type, number of rooms | 4 |
| Customer User | Manual data entry | Any | 5 |

As illustrated, each data source system 110 may store different types of information or there may be an overlap in the type of information stored. For example, data source system Bank A may store bank statements associated with various individuals having accounts at Bank A. The data stored in credit rating agencies Rating Agency A and Rating Agency B may overlap in that both may store credit score related information associated with various individuals. Data source system Gov't Agency A may store information such as social security numbers, addresses, etc., associated with various individuals.

The manner in which information may be retrieved from the various data source systems 110 may be different. For example, a first data source system may utilize a restful API, while a second data source may utilize SOAP commands to obtain data. Yet other data source system may utilize proprietary APIs to facilitate information retrieval. Therefore, each data source system 110 may be related to a Communication Detail field that indicates the manner in which information may be retrieved from the related data source system 110. The DATAS 102 may query this field and configure the I/O processor 205 accordingly to facilitate communications with a given data source system 110.

As noted in Table 2, each data source system 110 may be associated with a trustworthiness field. The trustworthiness field provides a relative indication of the trustworthiness/accuracy of information received from a given data source system 110. For example, a trustworthiness of one (1) may indicate a source of data that is fully-trusted, whereas a trustworthiness of five (5) may indicate data that needs to be independently verified. The level of trustworthiness associated with each item of information may be communicated to the agent system 106, as described below.

In some implementations, the level of trustworthiness may be the same for all information originating from a given data source system 110. For example, all information coming from Rating Agency A may have a trustworthiness of 3. In other implementations, different levels of trustworthiness may be associated with different items of information originating from the same data source system 110. For example, a raw credit score originating from Rating Agency A may have a trustworthiness of two (2), whereas loan information acquired by Rating Agency A in determining the raw credit score may be given a lower level of trustworthiness.

At block 310, the DATAS 102 may receive the requested information from one or more data sources.

At block 315, information received from the various data source systems 110 that is required by the agent system 106 to process a transaction may be aggregated and communicated to the user terminal 104. For example, the I/O processor 205 may generate an interface that facilitates viewing the information. The interface may be configured to allow the user to approve, reject, and/or edit the information. After reviewing and/or editing the information by the user, the user terminal 104 may submit the information.

At block 320, after receiving approval from the user, the information received from the various data source systems 110 or entered via user terminal 104, which is required by the agent system 106 to process a transaction, may be aggregated and communicated to the agent system 106. Table 3 illustrates exemplary information that may be communicated to the agent system 106.

TABLE 3

| Category | Value | Source | Trustworthiness |
| --- | --- | --- | --- |
| First name | John | User | 5 |
| Last name | Doe | User | 5 |
| Bank Account 1 | $10,000 | Bank A | 1 |
| Bank Account 2 | $5000 | Bank A | 1 |
| Credit Score 1 | 560 | Rating Agency A | 3 |
| Credit Score 2 | 650 | Rating Agency B | 2 |
| Address 1 | 555 Main St. Chicago, IL (2000-2002) | Gov't Agency A | 1 |
| Address 1 | 222 West St. Chicago, IL (2002-2015) | Gov't Agency A | 1 |
| ... | ... | ... | ... |

In some instances, multiple values may exist for an information category. For example, multiple bank account values may be provided. Similarly, multiple addresses at which the corresponding user may have lived may be provided.

Each item of information may be associated with a data source system 110 from which the information was obtained along with a trustworthiness value indicative of the trustworthiness/accuracy of the information. The agent system 106 may utilize these two fields to determine whether any additional information may be required.

Figure 4:
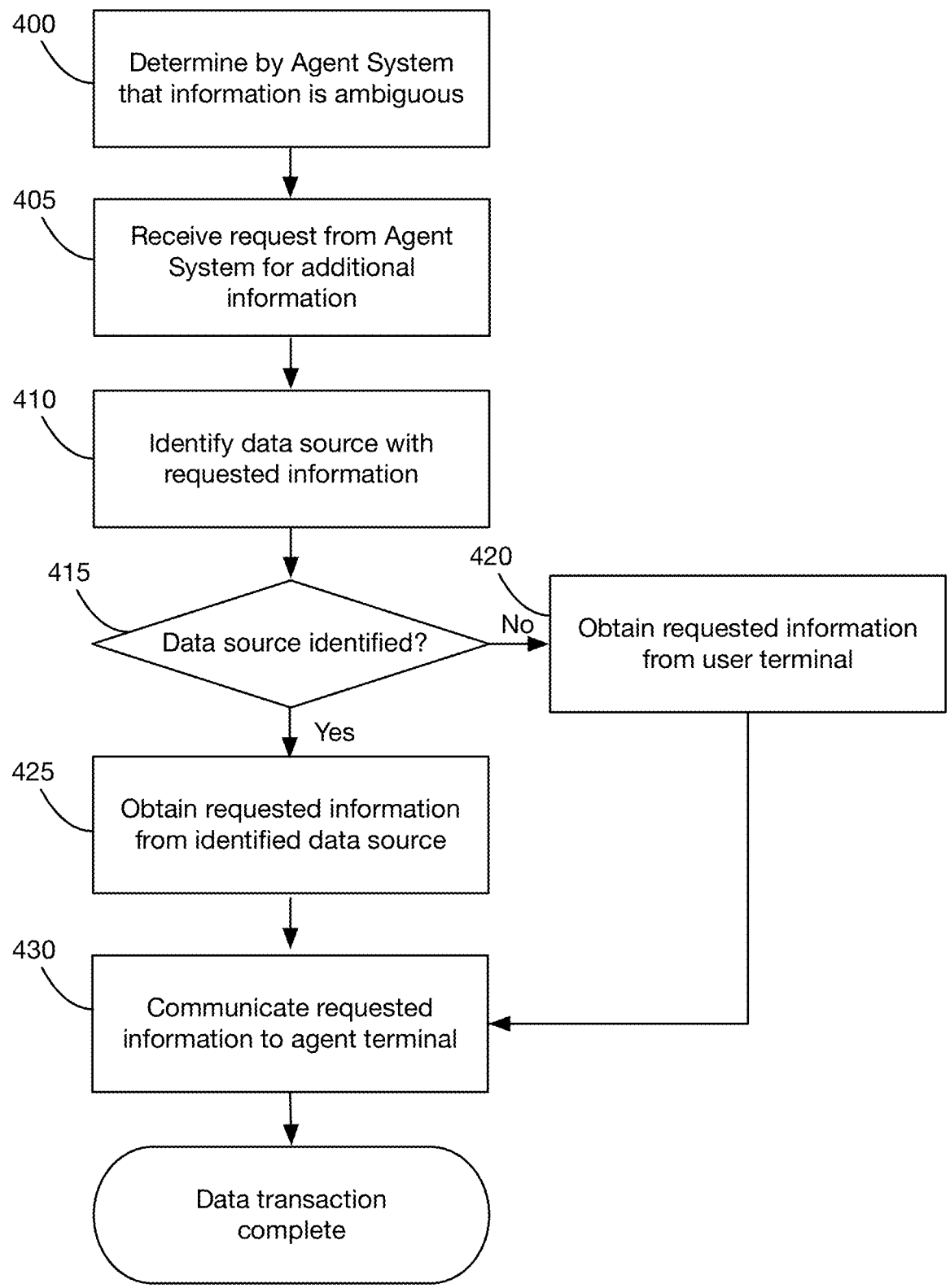

Exemplary embodiments are configured to disambiguate information when two or more pieces of information conflict or prevent a satisfactory decision from being made. The operations of FIG. 4 may be performed when some of the aggregated information is ambiguous or does not meet level of trustworthiness required by the agent. For example, at block 400, the agent system 106 may determine that the credit score information is ambiguous.

At block 405, the agent system 106 may request additional information related to accounts that may have led to the ambiguity. In this regard, the requested for information may be communicated to the DATAS 102.

At block 410, the DATAS 102 attempts to identify a data source that may include the requested information.

If at block 415, no data source is identified, then at block 420 the I/O processor 205 may generate an interface to the user terminal 104. I/O processor 205 may communicate the interface to user terminal 104 to obtain the information therefrom. For example, a web browser interface may be generated and configured to prompt a user to input the requested information into an input field of the interface and to click a submit button to cause the information to be submitted to the DATAS 102.

In some implementations, the interface may prompt the user to take a picture of a document such as a bank statement. The picture may be communicated to the DATAS 102 and processed using OCR and AI techniques to capture information on the document. This in turn eliminates delays that would otherwise be caused by (i) the need to send documents though the mail; (ii) the need to scan received documents at the receiving (agent) end; (iii) the need for an agent to read the scanned images and transcribe the necessary information onto an agent system; and (iv) the need to send further documents should errors, omissions and/or inconsistencies be revealed during transcription.

If at block 415, a data source is identified, then at block 425, the requested information may be obtained/received from the identified data source system 110 by the DATAS 102.

At block 430, the additional information requested by the agent system 106 may be communicated to the agent system 106 to thereby facilitate completion of the transaction by the agent system 106.

Figure 6:
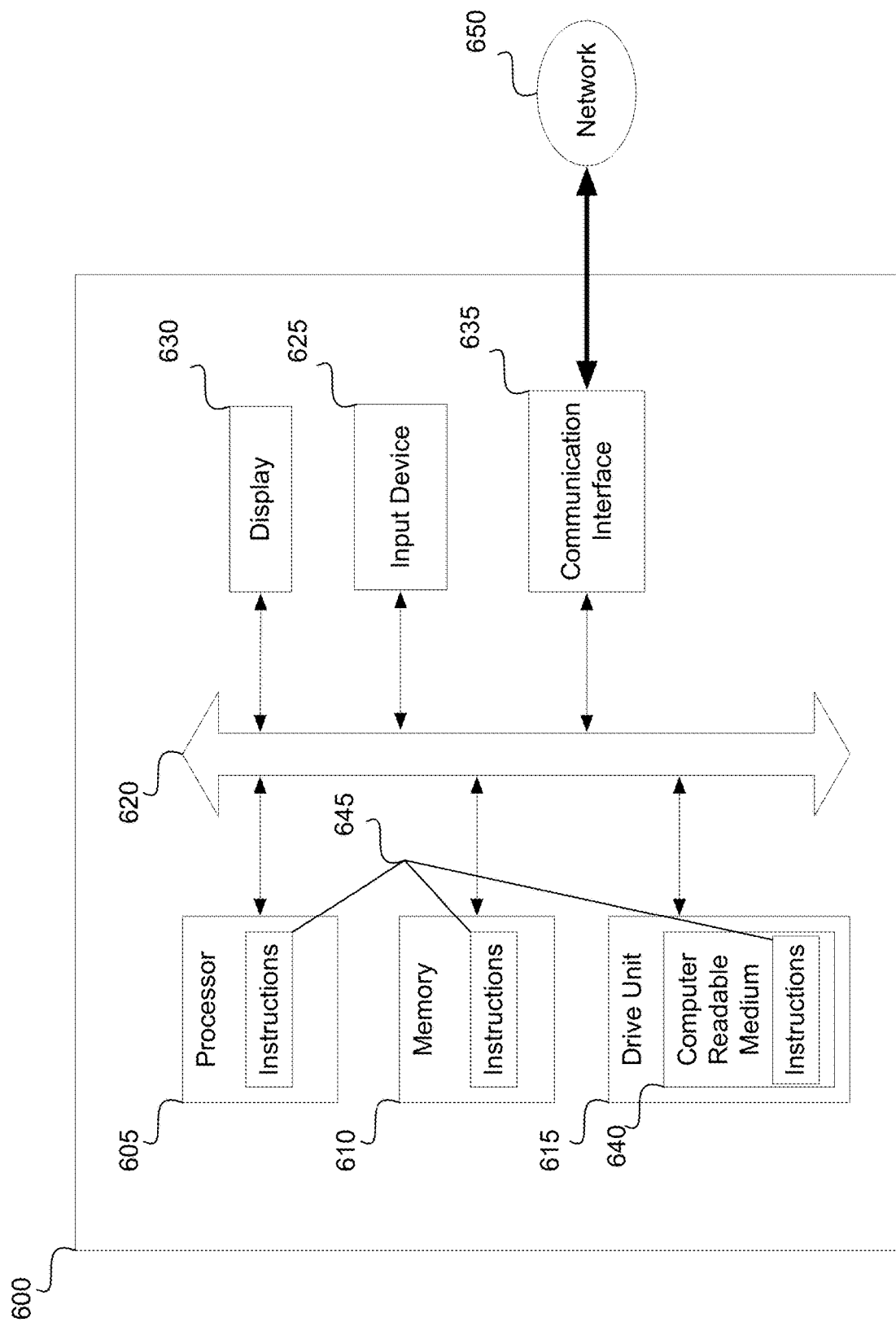
FIG. 6 illustrates an exemplary computer system that may form part of or implement the systems described in the figures or in the following paragraphs.

FIG. 6 illustrates a computer system 600 that may form part of or implement the systems, environments, devices, etc., described above. The computer system 600 may include a set of instructions 645 that the processor 605 may execute to cause the computer system 600 to perform any of the operations described above. The computer system 600 may operate as a stand-alone device or may be connected, e.g., using a network, to other computer systems or peripheral devices.

In a networked deployment, the computer system 600 may operate in the capacity of a server or as a client computer in a server-client network environment, or as a peer computer system in a peer-to-peer (or distributed)

environment. The computer system 600 may also be implemented as or incorporated into various devices, such as a personal computer or a mobile device, capable of executing instructions 645 (sequential or otherwise) to cause a device to perform one or more actions. Further, each of the systems described may include a collection of subsystems that individually or jointly execute a set, or multiple sets, of instructions to perform one or more computer operations.

The computer system 600 may include one or more memory devices 610 communicatively coupled to a bus 620 for communicating information. In addition, code operable to cause the computer system to perform operations described above may be stored in the memory 610. The memory 610 may be a random-access memory, read-only memory, programmable memory, hard disk drive or any other type of memory or storage device.

The computer system 600 may include a display 630, such as a liquid crystal display (LCD), a cathode ray tube (CRT), or any other display suitable for conveying information. The display 630 may act as an interface for the user to see processing results produced by processor 605.

Additionally, the computer system 600 may include an input device 625, such as a keyboard or mouse or touchscreen, configured to allow a user to interact with components of system 600.

The computer system 600 may also include a disk or optical drive unit 615. The drive unit 615 may include a computer-readable medium 640 in which the instructions 645 may be stored. The instructions 645 may reside completely, or at least partially, within the memory 610 and/or within the processor 605 during execution by the computer system 600. The memory 610 and the processor 605 also may include computer-readable media as discussed above.

The computer system 600 may include a communication interface 635 to support communications via a network 650. The network 650 may include wired networks, wireless networks, or combinations thereof. The communication interface 635 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A system for processing a digital transaction comprising:
   a user biometric authenticator configured to:
   receive biometric data associated with a user, wherein the biometric data is received from a sensor, and the sensor corresponds to at last one of: an image sensor, a finger print sensor, a user interaction pattern sensor, and an infrared image sensor;
   receive user identifying information from a first interface;
   determine whether the biometric data associated with the user is associated with the user identifying information;
   validate the user based on the user identifying information; and
   generate validated user credentials when the user is validated, the validated user credentials associated with the user,
   a processor in communication with the user biometric authenticator; and
   non-transitory computer readable media that stores instruction code that when executed by the processor causes the processor to:
   receive, from a user terminal, the validated user credentials;
   after receiving from the user terminal the validated user credentials:
   determine different categories of information required to process the digital transaction, the different categories of information including financial information of the user;
   determine two or more data source systems, wherein the data source systems store information related to the different categories of information and the user identifying information, the two or more data source systems storing user financial information from a bank or a credit agency;
   determine a communication protocol corresponding to each of the determined two or more data source systems by using a lookup table that contains two or more of communication protocols comprising a Representational State Transfer Application Programming Interface (RESTful API), a Simple Object Access Protocol (SOAP), or a proprietary API, each one of the communication protocols being related to at last one of the determined two or more data source systems;
   configure the processor based on the determined communication protocol to facilitate communications with the determined two or more data source systems;
   request and receive, through the user terminal, user access credentials for access to different categories of information on at least one of the two or more data source systems storing user financial information;
   receive from the determined two or more data source systems the information associated with the user identifying information;
   determine a trust level for two or more categories of the different categories of information including financial information of the user;
   determine whether the determined trust level applicable to user information associated with a first category of the two or more categories of information including financial information of the user, received from a first data source system of the determined two or more data source systems, is below a predetermined trust level; and when the determined trust level is below the predetermined trust level, identify a second data source system to provide additional information related to the user financial information associated with the first category of information having a determined trust level below the predetermined trust level;

in response to the determined trust level being below the predetermined trust level, request the additional information from the identified second data source system;

when the second data source system cannot be identified to provide the requested additional information, communicate a second interface to the user terminal that requests the user of the user terminal to provide additional information into the second interface related to the user information associated with the first category of information, wherein in response to the second data source system not being identified the second interface prompts the user to input into the second interface an image of a document containing the requested additional information related to the user financial information associated with the first category of information;

receive the user input information comprising the image of the document containing the requested additional information related to the user financial information from the user terminal;

aggregate, from the determined two or more data source systems, the user financial information associated with the user identifying information and the user input information received from the user terminal; and communicate the aggregated information to a processing system, wherein the processing system is configured to process the digital transaction.

2. The system according to claim 1, wherein the system further comprises an input/output processor, wherein the instruction code causes the processor to:

control the input/output processor to:
generate the first interface that facilitates receiving user identifying information and scanning an identification document with the image sensor; and
communicate the first interface to the user terminal;
receive the user identifying information and image data from the image sensor associated with the identification document;
identify textual images in the image data; and
convert the textual images in the image data to text information, wherein the text information facilitates processing the digital transaction.

3. The system according to claim 2, wherein the identification document includes an image of an individual associated with the identification document, wherein the first interface is further configured to control the sensor of the user terminal to capture an image of the user, and wherein the instruction code causes the processor to compare the image of the user with the image of the individual associated with the identification document to determine whether the user of the user terminal is the individual associated with the identification document.

4. The system according to claim 1, wherein the instruction code, when executed, causes the processor to:

receive, via the input/output processor and from the processing system, a listing that identifies categories of information required to process the transaction.

5. The system according to claim 1, wherein prior to communicating the aggregated information to the processing system, the instruction code, when executed, causes the aggregated information to be communicated to the user terminal to facilitate review and acceptance of the aggregated information by the user.

6. The system according to claim 1, wherein prior to aggregating, from the two or more data source systems, the information associated with the user, the instruction code, when executed, causes a request for consent to obtain the information is communicated to the user terminal to thereby grant a user of the user terminal control over whether the information associated with the user can be aggregated.

7. A method for processing a digital transaction comprising:

receiving, from a sensor of a user terminal, biometric data associated with a user,
the sensor corresponding to at last one of: an image sensor, a finger print sensor, a user interaction pattern sensor, and an infrared image sensor,
receiving user identifying information via a first interface;
determining whether the biometric data associated with the user is associated with the user identifying information;
validating the user based on the user identifying information;
generating validated user credentials associated with the user when the user is validated;
receiving the validated user credentials;
after receiving the validated user credentials:
determining different categories of information required to process the digital transaction, the different categories of information including financial information of the user,
determining two or more data source systems that store information related to the different categories of information and the user identifying information, the two or more data source systems storing user financial information from a bank or a credit agency;
determining a communication protocol corresponding to each of the determined two or more data source systems by using a lookup table that contains two or more of communication protocols comprising a Representational State Transfer Application Programming Interface (RESTful API), a Simple Object Access Protocol (SOAP), or a proprietary API, each one of the communication protocols being related to at last one of the determined two or more data source systems;
configuring a processor based on the determined communication protocols to facilitate communications with the determined two or more data source systems;
requesting and receiving user access credentials for access to the different categories of information on at last one of the two or more data source systems storing user financial information;
receiving from the determined two or more data source systems the information associated with the user identifying information;
determining a trust level for two or more categories of the different categories of information including financial information of the user;
determining whether the determined trust level applicable to user information associated with a first category of the two or more categories of information, received from a first data source system of the determined two or more data source systems, is below a predetermined trust level; and when the determined trust level is below the predetermined trust level, identifying a second data source system to provide additional information related to the user financial information associated with the first category of information having a determined trust level below the predetermined trust level;

in response to the determined trust level being below the predetermined trust level, requesting the additional information from the identified second data source;

when the second data source system cannot be identified to provide the requested additional information, communicating a second interface to the user terminal that requests the user of the user terminal to provide additional information into the second interface related to the user information associated with the first category of information, wherein in response to the second data source system not being identified the second interface prompts the user to input into the second interface an image of a document containing the requested additional information related to the user financial information associated with the first category of information;

receiving the user input information comprising the image of the document containing the requested additional information related to the user financial information from the user terminal;

aggregating, from the determined two or more data source systems, the user financial information associated with the user identifying information and the user input information received from the user terminal; and communicating the aggregated information to a processing system to thereby process the digital transaction.

8. The method according to claim 7, wherein receiving information that identifies the user further comprises:
generating the first interface that facilitates receiving user identifying information and scanning an identification document with the image sensor;
communicating the first interface to the user terminal;
receiving, from the user terminal and via the first interface, the user identifying information and image data from the image sensor associated with the identification document;
identifying textual images in the image data; and
converting textual images defined in the image data into text information, wherein the text information facilitates processing the digital transaction.

9. The method according to claim 8, wherein the identification document includes an image of an individual associated with the identification document, wherein the first interface is further configured to control the sensor of the user terminal to capture an image of the user, and wherein the method further comprises comparing the image of the user with the image of the individual associated with the identification document to determine whether the user of the user terminal is the same person as the individual.

10. The method according to claim 7, wherein determining the different categories of information required to process the digital transaction further comprises receiving, from the processing system, a listing of the different categories of information required to process the transaction.

11. The method according to claim 7, wherein prior to communicating the aggregated information to the processing system, the aggregated information is communicated to the user terminal to facilitate review and acceptance of the aggregated information by the user.

12. A non-transitory computer readable media that stores instruction code for processing a transaction, the instruction code being executable by a machine for causing the machine to perform acts including:
receiving, from a sensor of a user terminal, biometric data associated with a user;
receiving user identifying information via a first interface;
determining whether the biometric data associated with the user is associated with the user identifying information to thereby validate the user, and
if the user is validated, generating validated user credentials associated with the user;
receiving the validated user credentials;
after receiving the validated user credentials:
determining different categories of information required to process the digital transaction, the different categories of information including financial information of the user,
determining two or more data source systems that store information related to the different categories of information and the user identifying information, the two or more data source systems storing user financial information from a bank or a credit agency;
determining a communication protocol corresponding to each of the determined two or more data source systems by using a lookup table that contains two or more of communication protocols comprising a Representational State Transfer Application Programming Interface (RESTful API), a Simple Object Access Protocol (SOAP), or a proprietary API, each one of the APIs being related to at last one of the determined two or more source systems;
configuring the processor based on the determined communication protocol to facilitate communications with the determined two or more data source systems;
requesting and receiving, through the user terminal, user access credentials for access to the different categories of information on at least one of the two or more data source systems storing user financial information
receiving from the determined two or more data source systems the information associated with the user identifying information;
determining a trust level for two or more categories of the different categories of information including financial information of the user;
determining whether the determined trust level applicable to user information associated with a first category of the different categories of information including financial information of the user, received from a first data source system of the determined two or more data source systems, is below a predetermined trust level; and
when the determined trust level is below the predetermined trust level, identifying a second data source system to provide additional information related to the user financial information associated with the first category of information having a determined trust level below the predetermined trust level;
in response to the determined trust level being below the predetermined trust level, requesting the additional information from the identified second data source system;

when the second data source system cannot be identified to provide the requested additional information, communicating a second interface to the user terminal that requests the user of the user terminal to provide additional information into the second interface related to the user information associated with the first category of information, wherein in response to the second data source system not being identified the second interface prompts the user to input into the second interface an image of a document containing the requested additional information related to the user financial information associated with the first category of information;

receiving the user input information comprising the image of the document containing the requested additional information related to the user financial information from the user terminal;

aggregating, from the determined two or more data source systems, the user financial information associated with the user identifying information and the user input information received from the user terminal; and communicating the aggregated information to a processing system to thereby process the digital transaction.

13. The non-transitory computer readable media according to claim 12, wherein the instruction code causes the machine to:

generate the first interface that facilitates receiving user identifying information and scanning an identification document with the image sensor;

communicate the first interface to the user terminal;

receive the user identifying information and image data from the image sensor associated with the identification document from the user terminal via the first interface; and convert textual images defined in the image data into text information, wherein the text information facilitates processing the digital transaction.

14. The non-transitory computer readable media according to claim 13, wherein the identification document includes an image of an individual associated with the identification document, wherein the first interface is further configured to control the sensor of the user terminal to capture an image of the user, and wherein the instruction code causes the machine to compare the image of the user with the image of the individual associated with the identification document to determine whether the user of the user terminal is the same person as the individual.

15. The non-transitory computer readable media according to claim 12, wherein the instruction code causes the machine to receive, from the processing system, a listing of the different categories of information required to process the transaction.

* * * * *